Patented Sept. 8, 1931

1,822,016

UNITED STATES PATENT OFFICE

LLOYD C. DANIELS, OF CRAFTON, PENNSYLVANIA, ASSIGNOR TO THE SELDEN COMPANY, OF PITTSBURGH, PENNSYLVANIA, A CORPORATION OF DELAWARE

SEPARATION OF ORGANIC ACIDS

No Drawing.   Application filed May 28, 1930. Serial No. 456,830.

This invention relates to the separation of polycarboxylic acids from monocarboxylic acids.

Various catalytic reactions result in mixtures of polycarboxylic acids and monocarboxylic acids, and as a result the problem of separating the polycarboxylic acids from the monocarboxylic acids has become acute. Examples of such mixtures are those obtained from the catalytic splitting of polycarboxylic acids, for example mixtures of phthalic and benzoic acids, naphthalic and naphthoic acids, substituted phthalic and naphthalic, and the substituted benzoic and naphthoic acids, diphenic and phenyl benzoic acid, maleic of fumaric and acrylic acid, etc. Certain catalytic oxidations also result in the production of mixtures. Thus, for example, in the oxidation of naphthalene to phthalic anhydride, considerable amounts of maleic and benzoic acids are obtained as by-products, and maleic acid is obtained as a by-product from the oxidation of toluene to benzoic acid or a mixture of maleic and benzoic acid may be obtained as by-products in the catalytic oxidation of toluene to benzaldehyde.

According to the present invention the acids are separated by a process of partial neutralization, taking advantage of the fact that the dissociation constant for one hydrogen of the polycarboxylic acid is normally greater and in most cases very much greater than the dissociation constant of the corresponding monocarboxylic acid. For example, the first dissociation constant of phthalic acid is $1.21 \times 10^{-3}$ as compared to $6 \times 10^{-5}$ for benzoic acid, and even greater differences may be noted between maleic acid with a first dissociation constant of $1.17 \times 10^{-2}$ as compared with acrylic acid having a dissociation of $5.6 \times 10^{-5}$, and fumaric $9.3 \times 10^{-4}$. When, therefore, sufficient base, usually alkali, is present to combine with only one carboxyl group of the polycarboxylic acid, this reaction will take place to the practically complete exclusion of salt formation of the monocarboxylic acid. Similarly, if a mixture of salts of the two acids is present and a strong mineral acid is added to neutralize the correct amount of base, this will result again in the production of a mixture of the monosalt of the polycarboxylic acid and the free monocarboxylic acid.

After partial neutralization or acidification the mixture of the salt of the polycarboxylic acid and the free monocarboxylic acid can be readily separated because the two compounds show very different solubilities. The monosalt of the polycarboxylic acid is normally not soluble in organic solvents for the monocarboxylic acid, and the monocarboxylic acid can be leached out from a dry mixture of the monosalt of the polycarboxylic acid and the free monocarboxylic acid, or, as is usually the case in commercial practice, the separation is effected by treating a water solution or slurry of the two products with an organic solvent for the monocarboxylic acid. The process may be carried out as a batch process or continuous countercurrent separation may be used as described in connection with the separation of benzoic and phthalic acids described in the patent to A. O. Jaeger, No. 1,685,634 dated September 25, 1928.

All of the solvent may be added at once or in successive portions, the latter procedure usually being preferable. A single solvent may be used, for example, ether in the case of acrylic acid, or chloroform or benzol in the case of benzoic acid, or a plurality of solvents may be used, either mixed or in successive portions. I have found that a mixture of benzol and cresol is very satisfactory for the separation of benzoic acid from either maleic or phthalic acid. The cresol not only acts as a solvent for benzoic acid but also tends to dissolve colored impurities so that the polycarboxylic acid remaining is practically colorless and of high purity, and by suitably removing the benzoic acid from solution, for example by an aqueous sodium carbonate solution, it also may be decolorized. When cresol is used it is generally desirable to carry out the separation with several portions of solvent, the last washing being with benzol in order to remove the small amount of cresol dissolved in the water solution.

The invention is in no sense limited to the combined decolorization and separation described above, although this may be considered to be the preferred embodiment and is very effective as it results in products of extraordinary purity and beautiful appearance.

The present invention may be combined with other methods of purification such as fractional sublimation and the like, it being frequently desirable to remove some of the constituents of a crude mixture before subjecting it to the present process as the presence of other organic compounds greatly affects the solubility of the monocarboxylic acids which are removed by the process of the present invention.

The invention will be described in connection with the following specific examples. It should be understood, however, that these are merely illustrative and that the invention is not limited to any particular solvent or any combination of solvents, a few typical solvents having been named above and in the examples, but any others may be used, their suitability depending of course on the particular monocarboxylic acids and polycarboxylic acids present in a given crude product.

Example 1

A mixture containing about 1 part of acrylic acid and 3 parts of maleic acid is dissolved in water and neutralized with sufficient sodium carbonate to convert the maleic acid into the primary sodium salt. The solution is then treated with ether or other organic solvent for acrylic acid, either by a batch process or by permitting the organic solvent to flow in countercurrent as described in connection with the separation of benzoic acid and phthalic acid in the patent above referred to.

If desired the water solution may be heated and part of the acrylic acid may be boiled off, leaving a residue which contains maleic and acrylic acids, which may then be leached or washed with ether or other organic solvents for acrylic acid.

Example 2

A brownish water solution containing 500 parts of benzoic acid and 100 parts of maleic acid obtained by the catalytic oxidation of toluene is treated with just sufficient sodium carbonate to form the monosodium salt of maleic acid, and the solution is then treated with a weight of benzol about twice that of the benzoic acid present in the mixture. The treatment may be countercurrent or in a batch process. Benzoic acid is completely removed from the water solution of monosodium maleate, and both products can be recovered from their solutions in the usual manner.

Instead of benzol, solvent naphtha or chloroform may be used, or any other suitable solvent for benzoic acid, as monosodium maleate is insoluble in practically all organic solvents which are not miscible with water.

Example 3

A solution containing benzoic and maleic acids as described in Example 2 is treated with an amount of benzol and cresol equal to from 2–3 times the weight of benzoic acid present. The treatment is preferably effected by leaching with all of the cresol mixed with 80–90% of the benzol, either in a single batch, countercurrent, or in a plurality of portions, and the water solution of monosodium maleate containing a little cresol is then treated with the remaining 10–20% of the benzol in order to complete the removal of the cresol. The benzol and cresol thus obtained, which contains the last traces of benzoic acid, is added to the preceding batches of benzol and cresol, and the benzoic acid is separated by the usual methods. Maleic acid can be recovered in the usual manner, and both the maleic and benzoic acids are obtained in a state of high purity, the product being very light colored.

Example 4

A mixture of benzoic and phthalic acid containing about 100 parts of phthalic acid and 200 parts of benzoic acid, obtained by the catalytic splitting of phthalic anhydride with hydrogen or steam, is neutralized with sufficient sodium carbonate to transform all of the phthalic acid to monosodium phthalate, and the solution in then treated with about 600 parts of chloroform, either in a single batch or in successive portions. The chloroform removes the benzoic acid completely, and it can be recovered from the chloroform solution in the usual manner.

Example 5

A solution containing benzoic and phthalic acids such as described in Example 4 is treated with about 600 parts of a mixture of benzol and cresol, the ratio of benzol to cresol being about 2:1. After this treatment the water solution is treated with about 50 parts of benzol and the benzol which has dissolved the last traces of the cresol, together with the last traces of benzoic acid, is added to the benzol-cresol mixture obtained in the first washing step. Benzoic acid and phthalic acid are recovered from their respective solutions in the form of snowy-white crystals.

The specific examples describe the use of certain amounts of reagents. It should be understood, however, that the process is in no sense dependent on any particular ratio of organic solvent to monocarboxylic acid present in the original solution. On the contrary the amount of organic solvent can be varied within extremely wide limits. In general, however, the amount of solvent should be somewhat more than that required to dissolve all of the mono-carboxylic acid as otherwise the separation is not perfectly clean. In the case of very cheap solvents a considerable excess cuts down the time of treatment required, and this saving in time of treatment must be balanced against the additional cost of solvent. Therefore, the best compromises for the most economical process will vary with different solvents and the proportions given in the examples are merely representative of good practice with the particular solvent referred to.

When a decolorizing agent such as cresol is used, the proportion of decolorizer to solvent may vary within wide limits as the amount of colored impurities varies considerably with different crude products treated. In general, however, the amount of decolorizer should preferably be considerably greater than the minimum required to dissolve all the colored impurities as a more rapid process and a more complete decolorization is thereby effected. Where the decolorizing agent is likewise a solvent for the monocarboxylic acid, as in the case of cresol, one of the cheapest and most effective decolorizing agents, the amount used is of course enormously in excess of the amount required to dissolve the colored impurities since a large portion of the decolorizing solvent is being used as a solvent for the monocarboxylic acid. Where a decolorizing solvent is used which is not a good solvent for the monocarboxylic acid, it should be normally used in much smaller amounts and even where it is a good solvent when its cost is high it may be used in amounts very much less than that indicated in the examples for cresol. The invention is in no sense limited to using a minimum amount of decolorizing solvent, the amount used being determined in every case by the cost of the solvent in comparison to the other factors of the process.

This application is in part a continuation of my application Serial No. 353,677, filed April 8, 1929 now Patent No. 1,770,393 dated July 15, 1930.

What is claimed as new is:

1. A method of separating polycarboxylic acids from monocarboxylic acids, which comprises transforming the polycarboxylic acid into the primary salt while leaving the monocarboxylic acid in the free state and subjecting the mixture thus obtained to the action of at least one organic solvent for the monocarboxylic acid in which the polycarboxylic acid salt is insoluble.

2. A method of separating polycarboxylic acids from monocarboxylic acids, which comprises transforming the polycarboxylic acid into the primary alkali metal salt in water dispersion and subjecting the dispersion to the action of an organic solvent for the monocarboxylic acid solvent, which does not show ready solubility in water and in which the polycarboxylic acid salt is insoluble.

3. A method according to claim 1, in which the mixture is likewise subjected to the action of a non-aqueous solvent for colored impurities.

4. A method according to claim 2, in which the mixture is likewise subjected to the action of a non-aqueous solvent for colored impurities.

5. A method according to claim 1, in which the polycarboxylic acid is an aliphatic polycarboxylic acid.

6. A method according to claim 1, in which the polycarboxylic acid is maleic acid.

7. A method according to claim 1, in which the polycarboxylic acid is maleic acid and the monocarboxylic acid is benzoic acid.

8. A method according to claim 2, in which the polycarboxylic acid is maleic acid and the monocarboxylic acid is benzoic acid.

9. A method according to claim 1, in which the polycarboxylic acid is an aromatic polycarboxylic acid.

10. A method according to claim 1, in which the polycarboxylic acid is phthalic acid.

11. A method according to claim 2, in which the polycarboxylic acid is phthalic acid.

12. A method according to claim 1, in which the polycarboxylic acid is phthalic acid and the monocarboxylic acid is benzoic acid.

13. A method according to claim 2, in which the polycarboxylic acid is phthalic acid and the monocarboxylic acid is benzoic acid.

14. A method according to claim 1, in which the polycarboxylic acid is phthalic acid and the monocarboxylic acid is benzoic acid, and the acids are also subjected to the action of a non-aqueous solvent for the colored impurities.

15. A method according to claim 2, in which the polycarboxylic acid is phthalic acid and the monocarboxylic acid is benzoic acid, and the acids are also subjected to the action of a non-aqueous solvent for the colored impurities.

16. A method according to claim 1, in which the polycarboxylic acid is phthalic acid and the monocarboxylic acid is benzoic acid, and the solvent contains at least one phenol.

17. A method according to claim 2, in which the polycarboxylic acid is phthalic acid and the monocarboxylic acid is benzoic acid, and the solvent contains at least one phenol.

18. A method according to claim 2, in which the polycarboxylic acid is phthalic acid and the monocarboxylic acid is benzoic acid, and the solvent contains at least one cresol.

19. A method of separating polycarboxylic acids from monocarboxylic acids, which comprises transforming the polycarboxylic acid into the primary salt in an aqueous dispersion and subjecting the dispersion to the action of a solvent for the monocarboxylic acid passing in counter-current with the aqueous dispersion.

20. A method according to claim 19, in which the polycarboxylic acid is phthalic acid and the monocarboxylic acid is benzoic acid.

Signed at Pittsburgh, Pa., this 26th day of May, 1930.

LLOYD C. DANIELS.